(12) United States Patent
Scholzen (10) Patent No.: US 11,731,379 B2
(45) Date of Patent: Aug. 22, 2023

(54) METHOD FOR MANUFACTURING DRIVE BELTS

(71) Applicant: Walther Flender GmbH, Duesseldorf (DE)

(72) Inventor: Andreas Scholzen, Moers (DE)

(73) Assignee: Walther Flender GmbH, Duesseldorf (DE)

( * ) Notice: Subject to any disclaimer, the term of this patent is extended or adjusted under 35 U.S.C. 154(b) by 0 days.

(21) Appl. No.: 17/258,190

(22) PCT Filed: Jul. 10, 2018

(86) PCT No.: PCT/EP2018/068690
§ 371 (c)(1),
(2) Date: Jan. 6, 2021

(87) PCT Pub. No.: WO2020/011342
PCT Pub. Date: Jan. 16, 2020

(65) Prior Publication Data
US 2021/0245461 A1    Aug. 12, 2021

(51) Int. Cl.
*B29D 29/08*    (2006.01)
(52) U.S. Cl.
CPC .................... *B29D 29/08* (2013.01)
(58) Field of Classification Search
CPC .. B29C 29/08; F16G 1/10; F16G 1/28; B29D 29/08
(Continued)

(56) References Cited

U.S. PATENT DOCUMENTS 3,078,206 A * 2/1963 Skura ............... H01J 25/42
156/196
3,138,962 A * 6/1964 Haines, Jr. ........... B29D 29/08
474/250
(Continued)

FOREIGN PATENT DOCUMENTS

CN    104295665 A    1/2015
DE    2359216 A1    6/1974
(Continued)

OTHER PUBLICATIONS

Machine translation WO2017178123A1 (Year: 2017).*
Machine translation DE202017101198U1 (Year: 2017).*

*Primary Examiner* — Matthew J Daniels
*Assistant Examiner* — Wayne K. Swier
(74) *Attorney, Agent, or Firm* — The Webb Law Firm (57) ABSTRACT

The invention is used to manufacture a drive belt. To this end, mould core (1) and outer mould (20) of a casting tool (G) are provided. In the case of mould core (1) inserted into the outer mould (20), a cavity (22) is formed in the casting tool (G). The mould core (1) or the outer mould (20) are provided with a geometry (2) to be represented on the drive belt. Said geometry has projections (3a, 3b) protruding from a base surface (8) and arranged spaced apart from one another, which have a head surface (7) and lateral surfaces (5, 6) which each delimit a gap (4) of the geometry (2) with in each case a base surface (8) present between two adjacent projections (3a, 3b). A textile layer (12) is laid on the geometry (2), which is supported on the head surfaces (7) and in each case extends with a section (13) over the gaps (4). A tension member (13) is laid on the textile layer (12) such that the textile layer (12) is fixed between the tension member (14) and the respective head surface (7). At the same time, an intermediate space (17) between the section (13) of the textile layer (12) extending over the gap (4) and (Continued)

the section (18) of the tension member (14) spanning the gap (4) is delimited in each gap (4). The cavity (22) and the intermediate spaces (17) are filled with a castable elastomer base material (B) after inserting the thus provided mould core (1) into the outer mould (20). As a result, the sections (13) of the textile layer (12) are pressed by the elastomer base material (B) against the lateral surfaces (5, 6) of the projections (3a, 3b) and the assigned base surface (8) of the respective gap (4). The drive belt sleeve obtained can be demoulded after the base material has solidified.

11 Claims, 4 Drawing Sheets

(58) Field of Classification Search
USPC .......................... 156/137, 138; 474/200, 205
See application file for complete search history.

(56) References Cited

U.S. PATENT DOCUMENTS

| | | | | |
|---|---|---|---|---|
| 3,418,186 | A * | 12/1968 | Wetzel | F16G 1/28 156/196 |
| 3,419,449 | A * | 12/1968 | Di Valcrio | B29D 29/08 156/196 |
| 3,964,328 | A * | 6/1976 | Redmond, Jr. | B29D 29/08 474/205 |
| 4,209,483 | A * | 6/1980 | Batchelar | B29D 29/106 264/315 |
| 4,486,375 | A | 12/1984 | Hirai | |
| 4,504,342 | A * | 3/1985 | Marsh | F16G 1/28 156/138 |
| 4,563,323 | A * | 1/1986 | Breher | B29C 48/303 425/371 |
| 5,066,344 | A * | 11/1991 | Inami | F16G 1/06 156/138 |
| 5,392,831 | A * | 2/1995 | Thomas | B29D 29/08 156/138 |
| 5,427,728 | A | 6/1995 | Beck et al. | |
| 6,443,866 | B1 * | 9/2002 | Billups | F16G 1/28 474/263 |
| 2007/0023127 | A1 * | 2/2007 | Onita | F16G 5/20 474/237 |
| 2012/0071286 | A1 | 3/2012 | Pasch | |
| 2014/0378255 | A1 | 12/2014 | Gibson | |

FOREIGN PATENT DOCUMENTS

| | | | |
|---|---|---|---|
| DE | 102011121656 A1 | 6/2013 | |
| DE | 202017101198 U1 * | 4/2017 | ........... B29C 33/302 |
| EP | 0280175 B1 | 5/1993 | |
| EP | 1537984 B1 | 2/2007 | |
| FR | 2665737 A1 | 2/1992 | |
| GB | 744907 A * | 2/1956 | ............. B29C 33/00 |
| GB | 1225667 | 3/1971 | |
| JP | S627532 A | 1/1987 | |
| WO | 9318315 A1 | 9/1993 | |
| WO | 2017153021 A1 | 9/2017 | |
| WO | WO-2017178123 A1 * | 10/2017 | ............. B29D 29/08 |

* cited by examiner

METHOD FOR MANUFACTURING DRIVE BELTS

CROSS-REFERENCE TO RELATED APPLICATIONS

This application is the United States national phase of International Application No. PCT/EP2018/068690 filed Jul. 10, 2018, the disclosure of which is hereby incorporated by reference in its entirety.

BACKGROUND OF THE INVENTION

Field of the Invention

The invention relates to a method for manufacturing drive belts.

Description of Related Art

A method of this type is known from WO 2017/153021 A1. In the case of the known method, a mould core and an outer mould of a casting tool are provided in a first work step. In this case, the circumferential surface of the mould core or the inner circumferential surface of the outer mould are provided with a geometry to be represented on the drive belt. A textile layer is laid on the geometry in a further work step. The mould core is set into the outer mould in a third work step such that the mould core and the outer core delimit a cavity between them. Optionally, a tension member can be arranged here in the cavity and the cavity can be sealed off from the environment at least in the region of the geometry to be represented on the drive belt. After positioning the mould core in the outer mould, the textile layer is placed on the surfaces delimiting the geometry in a fourth work step, and the placement of the textile layer on the surfaces forming the geometry is supported by generating an underpressure in the region of the free spaces, which are present after the placement of the textile layer between it and the geometry. At this point, an elastomer base material is introduced into the cavity of the casting tool and held there until it solidifies. Lastly, the belt sleeve can be demoulded from the casting tool and made into individual drive belts in a conventional manner.

With the known method, manufacture is possible in particular of timing belts, which is simplified compared with the conventional approach of producing drive belts on an elastomer basis. In this case, alternative materials, such as rubber materials, for example natural rubber or synthetic rubber, silicone-based materials, can also be used as a basis for drive belt manufacture.

In addition to the prior art explained above, a method for manufacturing a belt is known from EP 0 280 175 A2 which has a band main body, which is manufactured from a liquid castable elastomer material, a textile layer, which is provided over the surface of the main body, and a shock-absorbing substrate made of elastomer material, which is provided between the main body and the textile layer. The belt has the shape of a flat belt or a timing belt with teeth on at least one side. The shock-absorbing substrate should give it improved flexible strength and improved operating performance. In this case, such a belt can be manufactured by a method in which the shock-absorbing substrate is formed of elastomer material on a surface of the textile layer, in which the thus coated fabric is fastened on an inner core of a casting mould and in which lastly a liquid elastomer material is cast into a mould space, which is delimited on its inner side by the inner core and on its outer side by an outer mould core.

A method for manufacturing a timing belt based on a different principle is known from US 2012/0071286 A1. In the case of this method, a fabric strip with predetermined width is wound on a mandrel at a first helix angle. A tension member is then wound on the mandrel via the fabric strip at a second helix angle which is smaller than the first helix angle. Lastly, a plurality of strips of an elastomer material are wound around the tension member sleeve. Subsequently, a unit is generated by a vulcanisation method from the sleeves formed in this way.

A further alternative method is known from WO 93/18315 for manufacturing a timing belt. In the case of this method, at least one substrate of a thermoplastic material is placed around the outer circumferential surface of a building drum which has on its outer circumferential surface a geometry defined by alternating teeth and grooves. Subsequently, the thermoplastic substrate is pressed under heat application against the drum so that the geometry of the outer circumference of the drum is moulded on the thermoplastic substrate. The heat application is dosed here such that the temperature of the thermoplastic material is under its softening temperature and under its melting temperature such that at least one part of the substrate of thermoplastic material enters into the grooves in order to represent the teeth of the belt to be manufactured. Prior to applying the thermoplastic material, a textile layer can be laid on the geometry of the building drum and a tension member layer wound around the textile layer.

Proceeding from the aforementioned prior art, the object is to further simplify the known method.

SUMMARY OF THE INVENTION

The method according to the invention for manufacturing a drive belt therefore comprises at least the following work steps:

a) Providing a mould core and an outer mould of a casting tool, with the mould core being provided to be inserted into the outer mould such that a cavity representing the mould of the drive belt to be manufactured is formed between the outer mould and the mould core sitting inside it and with the circumferential surface of the mould core assigned to the cavity or the inner circumferential surface of the outer mould assigned to the cavity being provided with a geometry to be represented on the drive belt, the projections, which are arranged spaced apart from one another and each have a head surface arranged spaced apart from a base surface of the geometry and lateral surfaces at opposing sides, with opposing lateral surfaces of projections adjacent to one another and in each case a base surface present between two adjacent projections each delimiting a gap of the geometry;

b) Placing a textile layer on the geometry such that the textile layer, on the one hand, is supported on the head surfaces of the projections and, on the other hand, in each case a section of the textile layer extends over each of the gaps of the geometry;

c) Placing a tension member on the geometry covered with the textile layer such that the tension member is supported on the head surfaces of the projections of the geometry and, on the one hand, the textile layer is fixed in the region of the head surfaces of the projections between the tension member and the respective head surface and, on the other hand, in each gap is delimited an intermediate space between the section of the textile layer extending over the respective gap and the section of the tension member spanning the gap in question;

d) Inserting the mould core into the outer mould;

e) Introducing a castable elastomer base material into the cavity present between the outer mould and the mould core sitting inside it such that the cavity, including the intermediate spaces delimited in the region of the gaps by the section of the textile layer and the tension member are filled with the elastomer base material, with the sections of the textile layer assigned to the gap of the geometry being pressed by the elastomer base material against the lateral surfaces of the projections and the assigned base surface of the respective gap, with the region of the textile layer, which forms the gaps, being formed more strongly than the region of the textile layer which is held by the tension members on the head surfaces of the projections of the geometry;

f) Optionally: Pressing elastomer base material after completely filling the cavity and the gap regions with the base material in order to cause a pressure increase in the cavity;

g) Optionally: Maintaining the pressure acting on the elastomer base material until the elastomer base material has become sufficiently hard;

h) Demoulding the obtained drive belt sleeve;

i) Optionally: Separating the drive belt from the belt sleeve.

The method according to the invention is based on the method known from WO 2017/153021 A1. To explain possible method variants important for practical purposes, in particular to explain the elastomer base materials coming into question, the variants coming into question for the design of the textile layer and the tension member and the measures to be considered when introducing the elastomer base material into the casting mould, the disclosure of WO 2017/153021 A1 is hereby incorporated by reference in the disclosure of the present application.

When, in the present text, a measure, a work step or a feature is designated as "optional", then this means that this measure, this work step or this feature is in each case not necessarily part of the invention, but rather can be optionally implemented in order to achieve the advantage or effect explained in connection with the relevant optional measure, the relevant optional work step or the relevant optional feature.

For the method according to the invention, a casting tool with an outer mould and a mould core inserted into the outer mould is consequently used.

To this end, a mould core or an outer mould is provided, of which at least the mould core is provided on its circumference or the outer mould on its circumference with the geometry to be represented on the belt. The geometry in this case consists of projections, of which in each case two, similar in the case of a gear wheel geometry, are separated from one another by a gap.

In the case where using the method according to the invention a timing belt should be manufactured, this geometry is the negative of the gear geometry to be represented on the belt.

Unlike the prior art mentioned at the outset, the textile layer, in the case of the method according to the invention, is fixed, prior to inserting the casting core into the outer mould of the casting tool, by means of the tension member on the geometry. The tension member is to this end placed on the geometry and in this case supported on the head surfaces of the projections such that the textile layer is tensioned between tension member and the head surfaces of the projections with its sections located between the head surfaces of the projections and the tension member. In the region of the gaps of the geometry, intermediate regions, in contrast, emerge between the tension member and the textile layer, which are delimited on their one side by the tension member and on their other sides by the sections of the textile layer extending more or less loosely over the gaps.

In particular, when the geometry is formed on the outer circumference of a mould core, it is advantageous from a manufacturing point of view to place the tension member in the form of a tension member strand. Such a tension member can be easily wound around the mould core. In this case, the tension member can be placed in two or more running strands in order to achieve a particularly high load absorption. In order to optimise the load absorption, it may in particular help for two or more tension member strands to be attached running parallel to one another on the textile layer. The individual strands of the tension members can also consist of different materials in order to ensure an optimal behaviour when using drive belts generated according to the invention by a combination of tension members with different properties.

The fixing of the textile layer on the geometry according to the invention can, in the case where the geometry is formed on the inner circumferential surface of the outer mould, be carried out with suitable retaining elements which hold the tension member pressed against the head surfaces of the projections of the geometry and thus the fixing of the textile layer on the geometry according to the invention is achieved. Thus, the retaining elements can be formed for example as longitudinally or radially displaceable sliders, rods, pins or the like. The retaining elements can be formed such that a linear contact with the tension member results. To this end, retaining elements in the form of blades, rails or bars can also be used. They are in particular suitable when the geometry to be represented on the drive belt is formed on the outer circumferential surface of the mould core. In the case of production in which the teeth are formed on the rear side of the timing belt, depending on the shape of the respective tool core, a support ring or a support rail can also be used as the retaining element. While the mould core is set into the outer mould, the retaining elements retain their position and can subsequently, while the cavity of the casting tool is filled or after the cavity of the casting tool is filled with elastomer base material, be removed from the casting tool. Thus, it is for example possible to move the retaining elements out of the cavity after injecting a first portion of the elastomer base material step by step or continuously whilst leaving behind the tension member supported by the elastomer base material.

From a production point of view, the method according to the invention can be particularly advantageously applied when the geometry is formed on the mould core if the textile layer is laid on the geometry present on the mould core and the tension member subsequently laid around the mould core in a manner according to the invention. In this case, it has proven particularly favourable for the tension member to be wound around the mould core conventionally as a strand of individual fibres, fibre bundles or fibre strands and a tension member layer formed by the windings of the tension member running next to one another. This allows a tension member layer to be laid without problems with certain pre-tension around the mould core such that the pressing required to fix the textile layer can be readily generated and maintained between the head surfaces of the projections and the tension member layer until the textile layer and the tension member layer are held in position in the finished drive belt by the elastomer base material of the drive belt.

The windings of the tension member layer are expediently wound such that when the elastomer base material is subsequently introduced into the cavity of the casting tool, the elastomer base material penetrates through the generally fine passages which are present between the windings or between the fibres of the tension fibre strands forming the windings such that the tension member windings are completely covered or sheathed by the elastomer base material in the drive belt finally produced according to the invention.

In the case of the variant of the invention described above, the mould core is thus covered with a hose-shaped textile layer preferably pulled in the form of a hose over the mould core in order to subsequently wind the tension members on the textile layer. The tension member layer is under a defined pre-tension and as a result holds the textile layer fixedly on the geometry of the mould core. In each case on the heads of the toothing, the fabric of the textile layer is pressed by the pre-tension force of the tension members fixedly on the geometry.

In the subsequent filling process, the region of the textile layer, which forms the gap, is stretched greater than the region, which is fixedly held by the tension members on the head surfaces of the projections of the geometry. In this manner, the section of the textile layer assigned to the respective gap is pressed against the surfaces delimiting the gap in question when the elastomer base mass is introduced into the cavity of the casting mould and held in place there until the base mass is sufficiently solidified and the forming process has completed.

Excessive stretching of the textile layer in the region of the gaps can be avoided by the region extending in each case over the gap being drawn or arched into the respective gap even when placing the textile layer. Accordingly, a variant of the invention provides that the textile layer in the region of the gaps is pulled or pressed into the gaps between the projections of the geometry even when the textile layer is placed on the geometry. To this end, the textile layer in work step b) or c) of the method according to the invention with its section spanning the respective gap in each case can be arched into the gaps of the geometry such that the sections of the textile layer assigned to the gaps are in each case drawn in the direction of the base surface which delimit the respective gap. The fine adjustment of the textile layer in the gaps such that the textile layer abuts on the surfaces delimiting the gaps filling the corner regions between surfaces that meet one another in a without folds and precise manner, is also carried out here by the elastomer base material pressed into the cavity and the gap regions when filling the casting tool.

Pre-stretching of the sections of the textile layer extending over the gaps of the geometry and associated optimal placement of the sections in question on the surfaces delimiting the gaps can be supported here as a result of an underpressure being generated while placing the tension member in the region of the gaps of the geometry. To this end, the geometry can already be sealed in a leak-tight manner when winding the tension members on its front ends and a vacuum generated in the interior of the gaps. In order to apply underpressure to the gaps, air can be suctioned via at least one suction opening which opens in the lateral surface or the base surface of the respective gap.

After completing the placement of the tension member and stopping the underpressure, the fabric of the textile layer present in the region of the gaps can be relaxed and is then held comparatively loosely between the sections of the textile layer tensioned in the region of the head surfaces of the projections. It is also conceivable here to reduce the underpressure after placing the tension member only by a certain amount such that the section of the textile layer in the gaps still retains its base shape adapted to the gap shape.

In particular when the sections of the textile layer assigned to the gaps are pre-stretched or formed or pressed into the gaps, a targeted filling of the intermediate space surrounded in the region of the gaps by the textile layer and the tension member layer with elastomer base material can be easily achieved. The elastomer base material penetrates through the tension member layer conventionally and thus enters into the intermediate spaces which are delimited in the region of the gaps of the geometry by the sections of tension member and textile layer each spanning the respective gap. When the underpressure is completely turned off, it can be ensured by a suitable for example in the form of supply lines guided from the bottom into the sections of the cavity in question that the gap regions are also securely filled with elastomer base material and that as a result of the filling pressure, with which the elastomer base material is introduced into the cavity of the casting tool, the textile layer lies on the lateral surfaces of the projections delimiting the gap and on the base surface of the gap in question.

In the case where the pressure applied via the elastomer base material to fill the cavity of the casting tool is sufficiently high or the sections of the textile layer assigned to the gaps have been sufficiently pre-stretched or formed into the gaps prior to or during the placement of the tension member, application of underpressure during the filling of the elastomer base material can be completely dispensed with or the application of underpressure can be significantly reduced, whereby not only can the casting tool be significantly simplified, but also the energy consumption otherwise required for the generation of underpressure can be saved.

Alternatively or in addition to support of the placement of the textile layer on the geometry by means of application of underpressure, mechanical auxiliary means, such as the retaining elements already mentioned above in connection with the arrangement of the tension member on a geometry formed on the inner circumferential surface of the outer mould, serve to hold the sections of the textile layer assigned to the gaps pressed into the gaps between the projections of the geometry. In this case, it can also concern longitudinally displaceable sliders, rods, pins, blades, rails, bars or the like. They are optimally adapted to the shape and extension of the gaps of the projections such that they hold the textile layer as precisely as possible in place on the surfaces delimiting the respective gap, without colliding with the tension member layer when it is laid on the head surfaces of the projections of the geometry.

Only after the textile layer is fixed on the geometry in the manner according to the invention, is the casting tool completed by inserting the mould core into the outer mould (work step d)).

Then, the filling of the cavity of the casting tool takes place with elastomer base material, with the regions surrounded in the region of the gaps of the geometry by the textile layer and the tension member in particular also being filled during the filling process and in this case the textile layer pressed in the same manner as already explained tightly and smoothly on the surfaces delimiting the gaps of the geometry.

A particular advantage of the approach according to the invention is here that the fabric of the textile layer is stretched particularly uniformly. As a result of this, the textile layer has a uniform strength over the entire surface of the geometry of the casting tool covered by the textile layer and thus of drive belt formed therein. In particular in the force-transmission region of the drive belt, the textile layer is present with a strength which ensures a high load-bearing capacity and therefore a long service life.

In order to minimise the effort to pre-stretch the sections of the textile layer assigned to the gaps of the geometry using underpressure and to support the pressing of the textile layer on the surfaces delimiting the gaps used according to the invention, it is advantageous when the textile layer is impermeable to the elastomer base material. In this way, during filling, a maximum pressing force of the base material acts until the solidification of the elastomer base material which ensures that the textile layer is placed securely on the surfaces provided in each case for this purpose. If this process is supported by application of underpressure of the gap regions, then it is expedient to this end for the textile layer to also be impermeable to air. The respective impermeability of the textile layer can be achieved here as a result of the textile layer having a textile substrate, which ensures the required mechanical load-bearing capacity of the textile layer, and a coating carried by the textile substrate, which causes the respective impermeability of the textile layer. The coating can for example be applied here as a film on the textile substrate. In this case, it goes without saying that in each case two or more textile substrates or two or more coatings can be provided in order to achieve optimal properties of the textile layer in regard to the respective requirement.

The method according to the invention is equally suited for the manufacture of drive belts which have a closed shape, i.e. for example they are circular when not being used, or they are not closed, i.e. they have a defined start and a defined end.

All structures provided for technical purposes and extending extensively are understood as textiles here, which are manufactured from threads or fibres connected to one another. They include fabrics manufactured by weaving methods, which are particularly suited to the purposes according to the invention. However, knitted, crocheted, laid and all other textiles can be considered for use which fulfil the purpose the textile layer provided according to the invention there in the case of the drive belt to be finally manufactured according to the invention.

The textile used according to the invention for the drive belt manufacture and forming the textile layer placed on the geometry to be formed on the belt can consist of polyamide or an alternative material. In this case, the respective textile can optionally contain components, such as Teflon threads, which reduce friction during use.

The geometry provided in the casting tool according to the invention and to be represented on the drive belt to be manufactured is typically formed as a gear geometry, as is normal with drive belts used today in many cases, which are also therefore designated in practice as "timing belts".

The tension member can be manufactured from glass fibres, aramide fibres, carbon fibres, polyester fibres, steel wires, steel strands or another material suitable as a tension member with sufficient strength and flexibility. Of course, different fibres can be combined together in this case in order to enable optimal behaviour of the tension member under the loads occurring during use. Thus, it may for example be expedient to combine high-strength fibres with particularly flexible fibres in order to achieve a similarly high flexibility of the tension member with high tensile load. In this case, the tension member layer can also be formed as a textile blank instead of a tension member strand wound into a tension member layer. This textile is preferably formed such that its warp and weft threads surround openings which are so large that the elastomer base material can penetrate through them. In the case of such an open-pore textile penetrated in the finished belt by elastomer base material, an intensive fusing of the tension member layer with the elastomer base material is easily ensured which ensures that the forces loading on the belt during operation are safely absorbed by the tension member.

As an elastomer base material, an elastomer is used for the purposes according to the invention which is a polyurethane (duroplast or theromplast), rubber, silicone, or another material suitable for use as an elastomer base material for drive belt manufacture and usable for casting processes of the type according to the invention. Of course, mixtures or combinations of these materials can also be used.

The textile forming the textile layer or in the case where a tension member textile blank is used, this textile blank can comprise an identification device which clearly identifies the drive belt when using the finally manufactured timing belt as a passive element and/or, as an active element, detects at least one property or at least one state of the belt and sends it to a signal detection device.

Optionally, the elastomer base material is pressed after filling the cavity and the pressure acting on the elastomer base material maintained until the elastomer base material is solid. The belt sleeve obtained is demoulded and the timing belt optionally divided.

BRIEF DESCRIPTION OF THE DRAWINGS

The invention is explained in more detail below with reference to a drawing representing an exemplary embodiment. The schematic drawings show the following.

DESCRIPTION OF THE INVENTION

Figure 1:
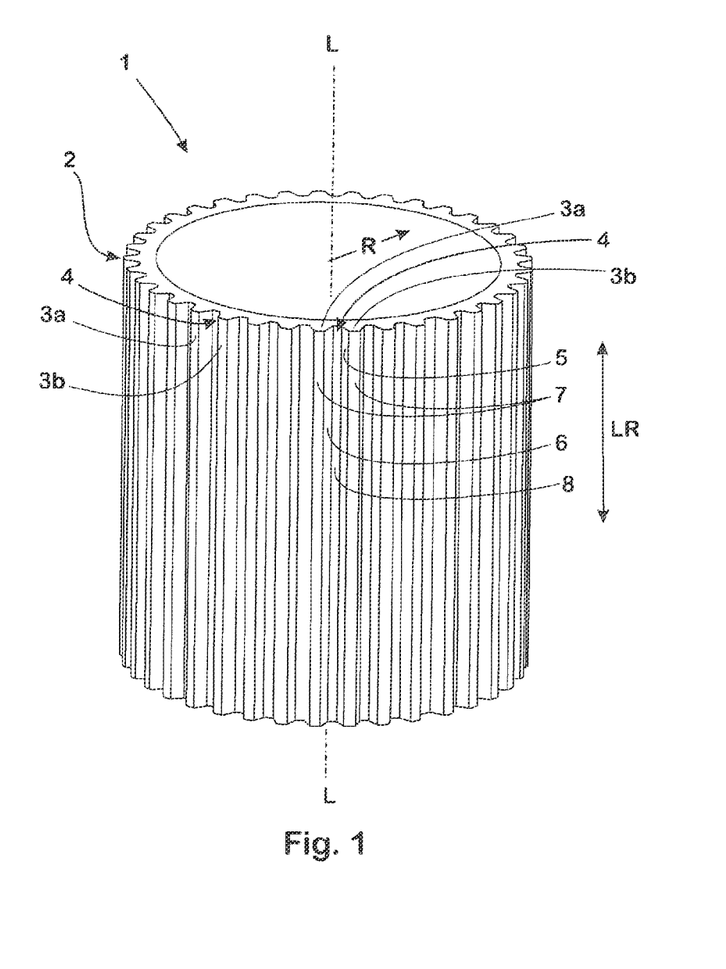
FIG. 1 a mould core for a casting tool to manufacture a drive belt in perspective view.

The tubular mould core 1 represented in FIG. 1 has on an outer circumference a geometry 2 which is formed in the manner of an outer toothing made of alternately arranged projections 3*a*, 3*b* and gaps 4, of which in each case one gap 4 is present between two projections 3*a*, 3*b*. The projections 3*a*, 3*b* and the gaps 4 each extend in the longitudinal direction LR of the mould core 1 axially-parallel to its longitudinal axis L.

The projections 3*a*, 3*b* are each formed in the manner of teeth of a gear wheel with external teeth and have lateral surfaces 5, 6 which taper to a head surface 7 of the projections 3*a*, 3*b* and each form an acute angle with the head surface 7. The lateral surfaces 5, 6 each merge into a base surface 8 of the respective gap 4 between two projections 3*a*, 3*b* with their side facing away from the head surface 7. In this way, each gap 4 is delimited on its longitudinal sides by one of the lateral surfaces 5, 6 of the projections 3a, 3b adjacent to one another at the gap 4 and at its bottom by the base surface 8 and the respective head surface 7 is arranged at a distance to the base surface 8.

Figure 4:
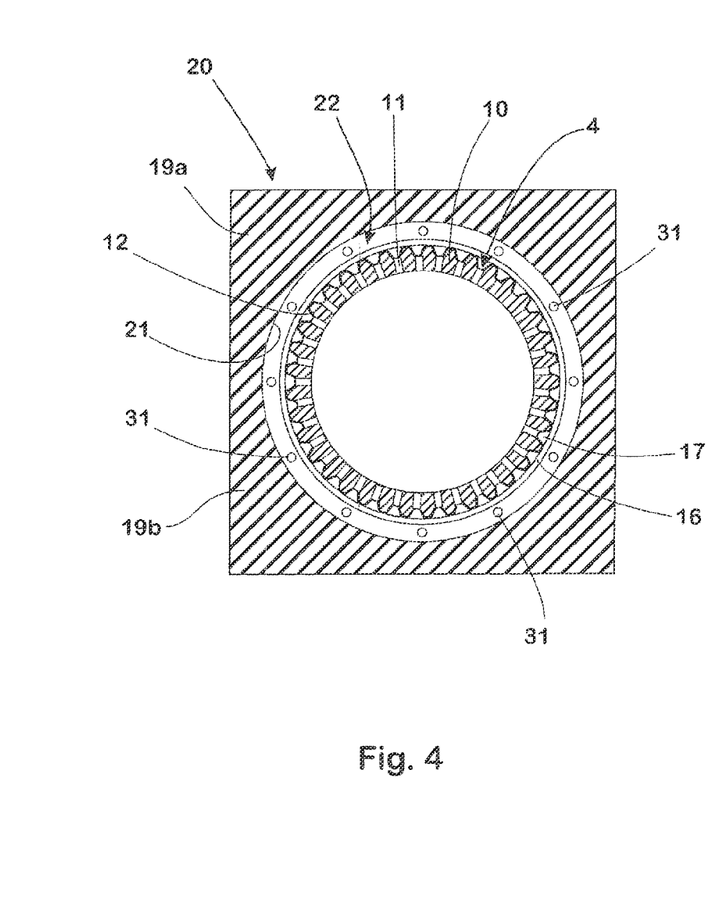
FIG. 4 a cast mould tool for manufacturing a drive belt in a section along the intersecting line X-X drawn in FIG. 5.
Figure 5:
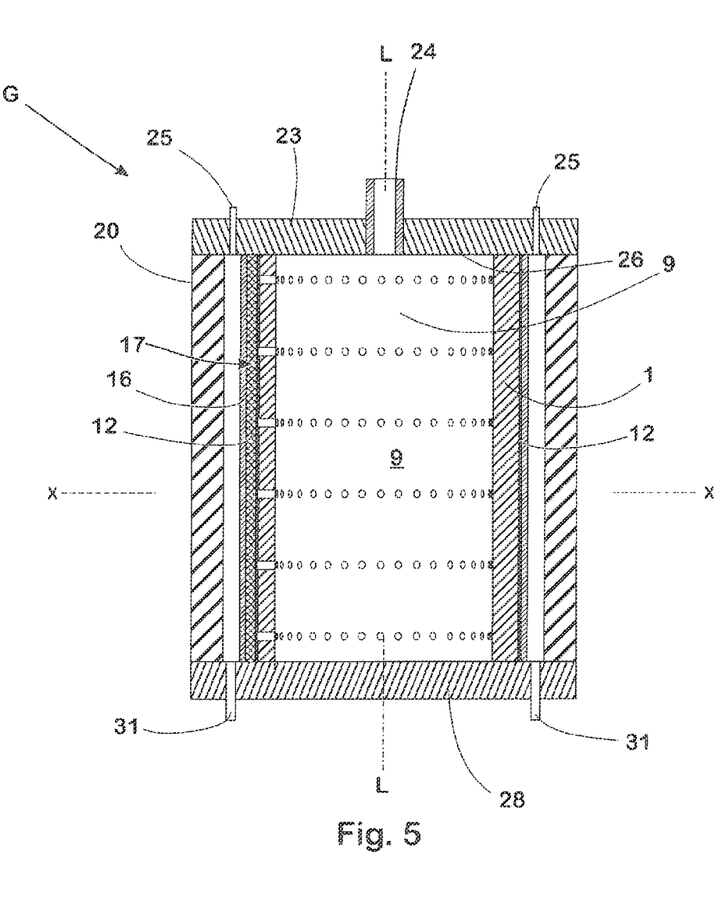
FIG. 5 the cast mould tool according to FIG. 4 in the state prepared for the introduction of an elastomer base material in a section along its longitudinal axis.

The mould core 1 surrounds a cylindrical space in which, as illustrated in FIGS. 4 and 5, optionally a central evacuation line 9 aligned coaxially to the mould core 1 and taking in the interior of the mould core 1 is provided. From the central evacuation line 9, as also illustrated in FIGS. 4 and 5, depart evacuation openings 11, optionally guided in each case in the radial direction R through the circumferential wall 10 of the mould core 1, which each open in the base surface 8 of one of the gaps 4.

Figure 2:
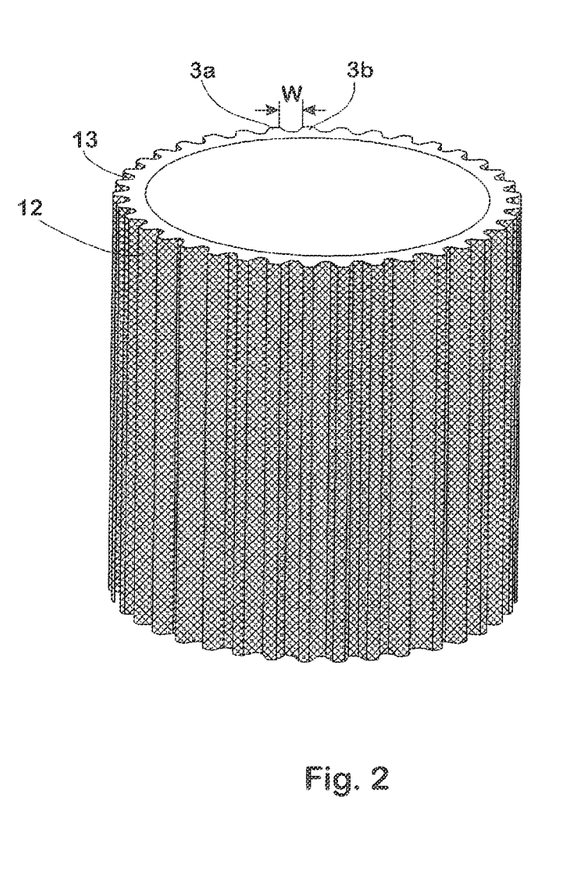
FIG. 2 the mould core according to FIG. 1 with a textile layer placed thereon in a view corresponding to FIG. 1.

For the manufacture of a timing belt sleeve, from which a larger number of timing belts can subsequently be separated, a textile layer 12 is laid around the mould core 1 which is formed as a hose. The textile layer 12 here consists of at least one textile substrate and a coating which has been coated as a film on the textile substrate and in this way makes the textile layer 12 impermeable to air and the elastomer base material B of the drive belt to be manufactured.

The circumferential length of the textile layer 12 is dimensioned taking into account its elasticity such that it corresponds in the stretched state to the length of the contour line of the geometry 2 such that the textile layer 12 can thus be placed without folds on the lateral surfaces 5, 6 and the head surfaces 7 of the projections and the base surface 8 of the geometry 2.

Figure 3:
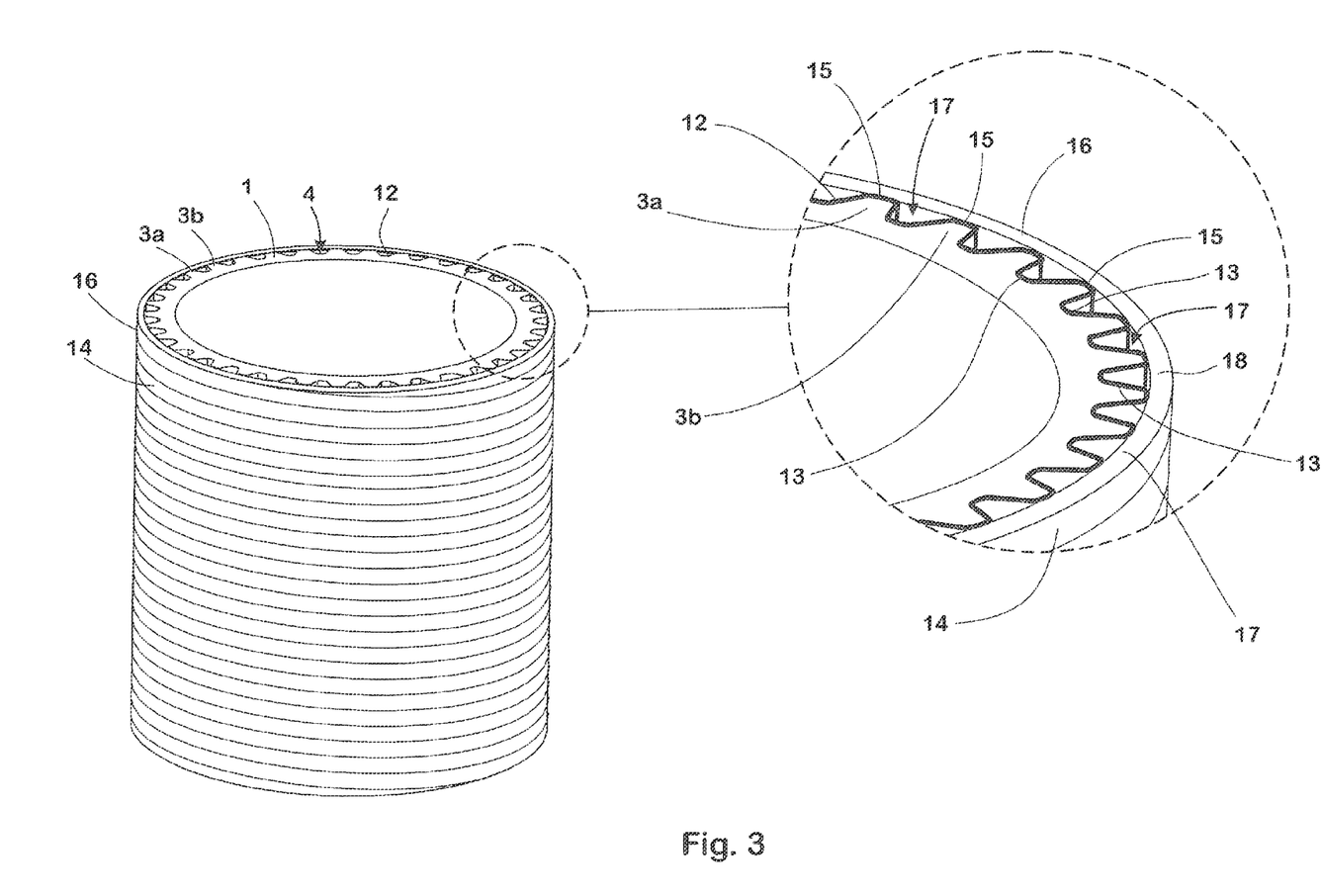
FIG. 3 the mould core according to FIG. 2 with a tension member placed thereon in a view corresponding to FIGS. 1 and 2.

The mould core 1 thus provided with the textile layer 12 is then wound with a tension member strand 14 of tension member fibres. While the tension member 14 is placed on the mould core 1 carrying the textile layer 12, the underpressure is applied to the gaps 4 by air being suctioned from the region of the gaps 4 via the evacuation line 9 and the evacuation openings 11 connected to it. Through the underpressure, the sections 13 of the textile layer 12 each freely spanning the gaps 4 are pulled into the gaps 4 and stretched here such that they are moved at least in rough alignment in the direction of the lateral surfaces 5, 6, delimiting the respective gap 4, and base surface 8.

The tension member strand 14 is held during the winding under tensile stress, such that the sections 15 of the textile layer 12 located on the head surfaces 7 of the projections 3a, 3b and loaded by the strand 14 are pressed against the respective head surface 7 with a pressing force sufficient for their fixing. The strand 14 wound with its windings side by side in a spiral shape around the mould core 1 carrying the textile layer 12 forms, in this way, a tension member layer 16 by way of which the textile layer 12 is held in an exact position on the mould core 1. In this case, there is an intermediate space 17 in each case in the region of the gaps 4 between the tension member layer 16 and the section 13 of the textile layer 12 arched into the respective gap 4, said intermediate space being delimited by the section 13 of the textile layer 12 in question and the section 18 of the textile layer 12 spanning the respective gap 4. At the same time, there are small distances between the individual windings of the sleeve formed by the tension member strand 14 around the textile layer 12 (FIG. 3).

The mould core 1 covered with the textile layer 12 and wound with the tension member layer 16 is set in the cylindrical interior of the outer mould 20. The diameter of the interior of the outer mould 20 is dimensioned such that a cavity 22 is formed between the inner circumferential surface 21 of the outer mould 20 and the mould core 1.

After positioning the mould core 1, the cavity 22 is sealed by means of a lid 23. The lid 23 has a connection 24 for the central evacuation line 9 connected to an evacuation device not shown here. At the same time, the lid 23 has at least one venting opening 25, via which air contained in the cavity 22 can escape when filling the cavity 22 with elastomer base material B.

The support of the mould core 1 on the lid 23 takes place via the front end 26 of the lid 23 assigned to the cavity 22. The front end 26 of the lid 23 sits on the upper front end of the mould core 1 such that the textile layer 12 ending there is clamped and secured against slipping.

On the side opposite the lid 23, the mould core 1 and the outer shell 20 sit on a bottom 28 which seals off the cavity 22 on the underside of the mould core 1. In this case, the mould core 1 sits with its lower front end on the bottom 28 such that the textile layer 12 is also secured there against slipping on the mould core 1.

Moreover, at least one nozzle 31 is guided through the bottom 28, via which, after the mould core 1 with the textile layer 12 located on its geometry 2 and the tension member layer 16 wound around the textile layer 12 have been set into the outer mould 20, elastomer base material B is introduced into the cavity 22. In the case of the exemplary embodiment shown here, a plurality of nozzles 31 are introduced into the bottom 28 distributed at equal angular distances around the longitudinal axis L in order to favour an equal filling of the cavity 22.

Figure 6:
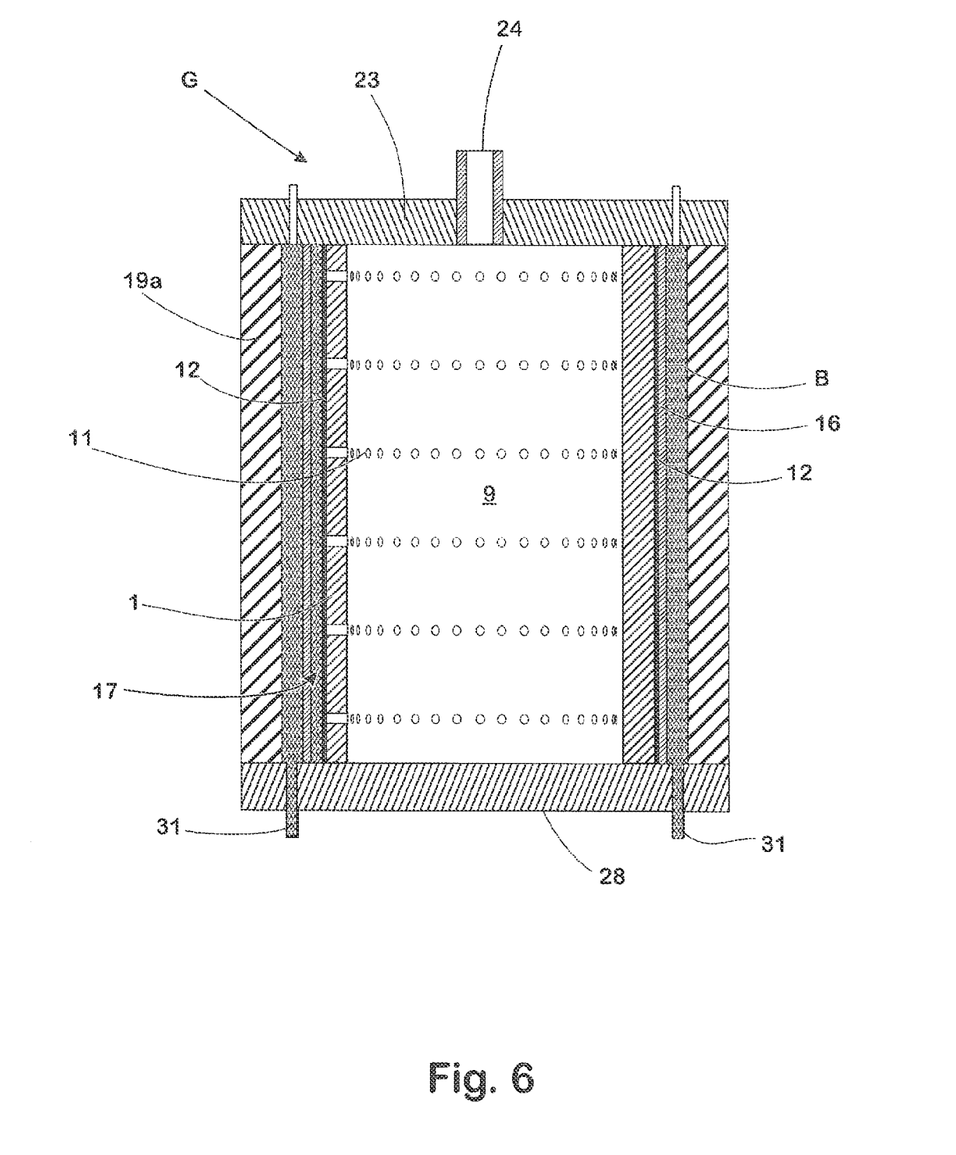
FIG. 6 the cast mould tool according to FIG. 4 after filling with the elastomer base material in a view corresponding to FIG. 5.

The elastomer base material B introduced into the cavity 22 penetrates the tension member layer 16 and enters the intermediate spaces 17. To this end, the elastomer base material B enters through the gaps present between and, possibly in the windings of the tension member strand 14 such that the tension member layer 16 is penetrated and sheathed by elastomer base material B.

The elastomer base material B entering into the intermediate spaces 17 in this way presses against the section 13 of the textile layer 12 surrounding the respective intermediate space 17 and causes the section 13 in question to be laid without folds against the lateral surfaces 5, 6 and the base surface 8 which delimit the respective gap 4.

The pressing of the elastomer base material B is advanced until the cavity 22 and thus the intermediate spaces 17 are completely filled with elastomer base material B and thus the lateral surfaces 5, 6 and the base surface 8 of all gaps 4 are completely covered with the assigned sections 13 of the textile layer 12.

After the end of the filling process, the air outlets 25 are closed. Optionally, a short pressure increase can now be caused in the elastomer base material B present in the cavity 22. The elastomer base material B (pressed) injected with increased overpressure for this purpose increases the certainty with which the geometry 2 of the mould core 1 is formed with the textile layer 12 and the elastomer base material B. The air possibly still present between the textile and the geometry 2 can escape here via the evacuation openings 11 and the evacuation line 9.

Then, the casting tool G, which comprises the mould core 1, the outer mould 20, the lid 23 and the bottom 28 with the further functional elements and other assemblies explained here, which are normally required for the operation of such a tool, are held closed until the elastomer base mass B is solidified such that the drive belt sleeve then obtained can be demoulded. To this end, the lid 23 and the bottom 28 are loosened from the outer mould 20 and the mould core 1 pulled out of the drive belt sleeve.

Drive belts are separated from the obtained drive belt sleeve in a manner known per se, whose width corresponds to the respective customer requirements. These drive belts have on their one side the toothing formed on them via the geometry 2 of the mould core 1, while their opposing side is smooth. In this case, the toothing is covered with the textile layer 12, on whose free side facing away from the elastomer base material B of the drive belt neither auxiliary film, nor elastomer base material B is present in the state pulled out of the mould core 1.

Therefore, the invention is used to manufacture a drive belt. To this end, a mould core 1 and an outer mould 20 of a casting tool G are provided. In the case of mould core 1 inserted into the outer mould 20, a cavity 22 is formed in the casting tool G. The mould core 1 or the outer mould 20 are provided with a geometry 2 to be represented on the drive belt. This geometry has projections 3a, 3b protruding from a base surface 8 and arranged spaced apart from one another, which have a head surface 7 and lateral surfaces 5, 6 which each delimit a gap 4 of the geometry 2 with in each case a base surface 8 present between two adjacent projections 3a, 3b. A textile layer 12 is laid on the geometry 2, which is supported on the head surfaces 7 and extends in each case with a section 13 over the gaps 4. A tension member 14 is laid on the textile layer 12 such that the textile layer 12 is fixed between the tension member 14 and the respective head surface 7. At the same time, an intermediate space 17 between the section 13 of the textile layer 12 extending over the gap 4 and the section 18 of the tension member 14 spanning the gap 4 is delimited in each gap 4. The cavity 22 and the intermediate spaces 17 are filled with a castable elastomer base material B after inserting the thus provided mould core 1 into the outer mould 20. As a result, the sections 13 of the textile layer 12 are pressed by the elastomer base material B against the lateral surfaces 5, 6 of the projections 3a, 3b and the assigned base surface 8 of the respective gap 4. The drive belt sleeve obtained can be demoulded after the base material has solidified.

REFERENCE NUMERALS

1 Mould core of the casting tool G
2 Geometry of the mould core
1, 3a, 3b projections of the geometry 2
4 gaps of the geometry 2
5, 6 lateral surfaces of the projections 3a, 3b
7 Head surface of the projections 3a, 3b
8 Base surface of the gap 4
9 Central evacuation line
10 Circumferential wall of the mould core 1
11 Evacuation openings
12 Textile layer
13 Sections of the textile layer 12 spanning the gaps 4
14 Tension member strand
15 Sections of the textile layer 12 located on the head surfaces 7 of the projections 3a, 3b
16 Tension member layer
17 Intermediate space delimited by the section 13 of the textile layer 12 arched into the respective gap 4 and the section 18 of the tension member layer 16 spanning the gap 4
18 Section of the tension member strand 14 spanning the respective gap 4
20 Outer mould of the casting tool G
21 Inner circumferential surface of the outer mould 20
22 Cavity of the casting tool G
23 Upper lid of the casting tool G
24 Connection for the central evacuation line 9
25 Venting openings in the lid 23
26 Front end of the lid 23
28 Bottom of the casting tool G
31 Nozzle in the bottom 28
B Elastomer base material
G Casting tool
L Longitudinal axis of the mould core 1
LR Longitudinal direction of the mould core 1
R radial direction

The invention claimed is:

1. A method for manufacturing a drive belt comprising the following work steps:
  a) Providing a mould core and an outer mould of a casting tool, wherein the mould core is provided to be inserted into the outer mould such that a cavity representing the mould of the drive belt to be manufactured is formed between the outer mould and the mould core sitting inside it and wherein the circumferential surface of the mould core assigned to the cavity or the inner circumferential surface of the outer mould assigned to the cavity is provided with a geometry to be represented on the drive belt, wherein the geometry comprises projections, which are arranged spaced apart from one another and each have a head surface arranged spaced apart from a base surface of the geometry and lateral surfaces at opposing sides, and wherein opposing lateral surfaces of projections adjacent to one another and in each case a base surface present between two adjacent projections each delimit a gap in the geometry;
  b) Placing a textile layer on the geometry such that the textile layer, on the one hand, is supported on the head surfaces of the projections and, on the other hand, in each case a section of the textile layer extends over each of the gaps of the geometry;
  c) Placing a tension member on the geometry covered with the textile layer such that the tension member is supported on the head surfaces of the projections of the geometry and, on the one hand, the textile layer is fixed in the region of the head surfaces of the projections between the tension member and the respective head surface and, on the other hand, in each gap is delimited an intermediate space between the section of the textile layer extending over the respective gap and the section of the tension member spanning the gap in question, wherein, during said placement of the tension member on the geometry covered with the textile layer, the textile layer with its sections extending over the respective gap is drawn into the respective gap of the geometry;
  d) Inserting the mould core into the outer mould;
  e) Introducing a castable elastomer base material into the cavity present between the outer mould and the mould core sitting inside it such that the cavity, including the intermediate spaces delimited in the region of the gaps by the section of the textile layer and the tension member are filled with the elastomer base material, wherein the sections of the textile layer assigned to the gaps of the geometry are pressed by the elastomer base material against the lateral surfaces of the projections and the assigned base surface of the respective gap, wherein the region of the textile layer, which forms the gaps, is stretched greater than the region of the textile layer which is held by the tension members on the head surfaces of the projections of the geometry;
  f) Optionally: Pressing elastomer base material after completely filling the cavity and the gap regions with the base material in order to cause a pressure increase in the cavity;

g) Optionally: Maintaining the pressure acting on the elastomer base material until the elastomer base material has become sufficiently hard;

h) Demoulding an obtained drive belt sleeve;

i) Optionally: Separating the drive belt from the belt sleeve.

2. The method according to claim 1, wherein the geometry, on which the textile layer is fixed by means of the tension member, is formed on the mould core.

3. The method according to claim 1, wherein the textile layer is formed in a hose shape.

4. The method according to claim 1, wherein the tension member is placed on the textile layer in two or more strands.

5. The method according to claim 4, wherein the tension member strands are placed on the textile layer running parallel to one another.

6. The method according to claim 1, wherein the textile layer is impermeable to the elastomer base material.

7. The method according to claim 1, wherein the textile layer is impermeable to air.

8. The method according to claim 6, wherein the textile layer has a textile substrate and a coating carried by the textile substrate, which causes the respective impermeability of the textile layer.

9. The method according to claim 8, wherein the coating is a film applied on the textile substrate.

10. The method according to claim 1, wherein an underpressure is generated in the region of the gaps while placing the tension member on the geometry.

11. The method according to claim 10, wherein air is suctioned via at least one evacuation opening to apply underpressure to the gaps which opens into one of the lateral surfaces or the base surface which delimit the respective gap.

* * * * *